United States Patent Office 3,530,333
Patented Sept. 22, 1970

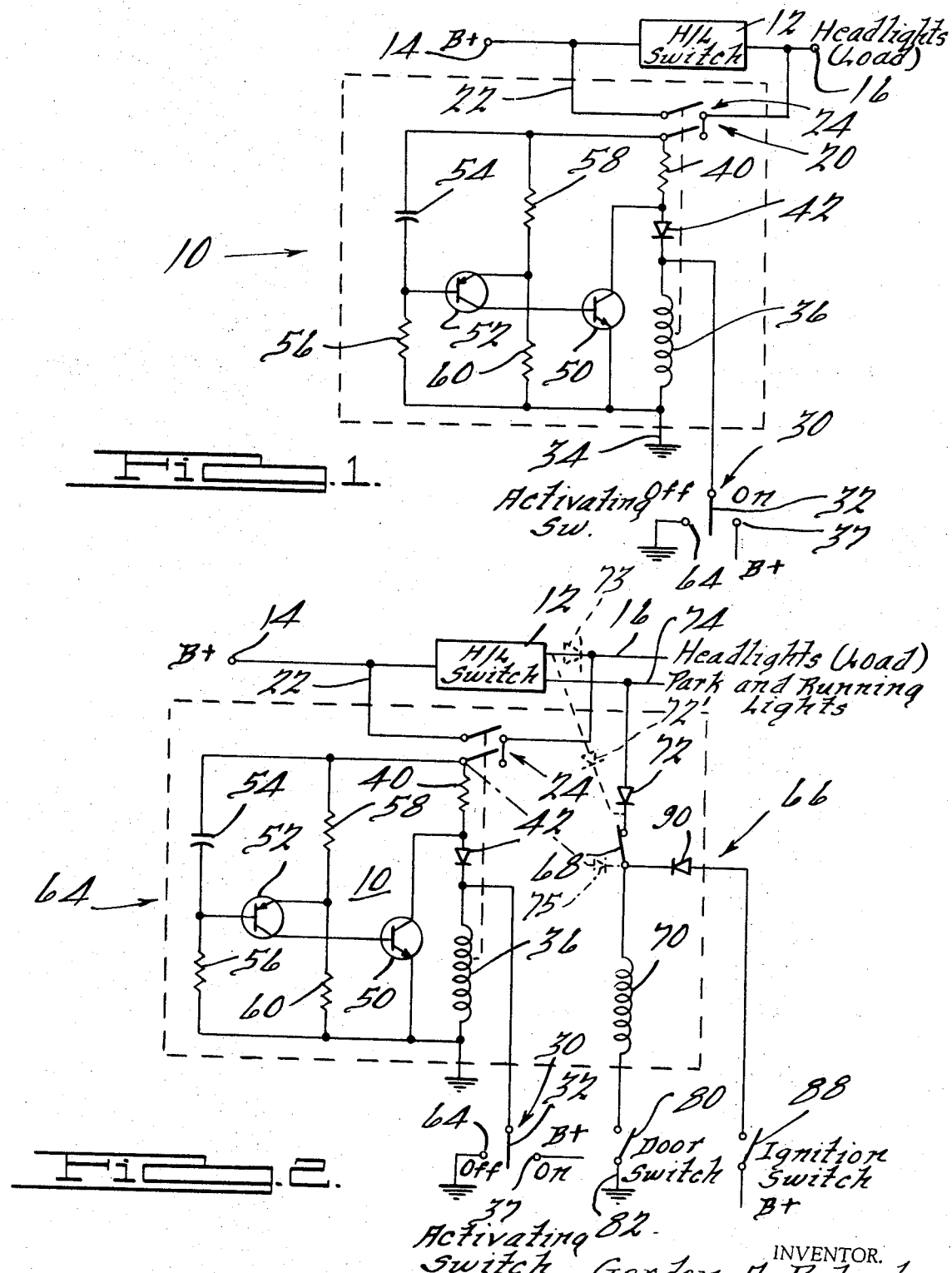

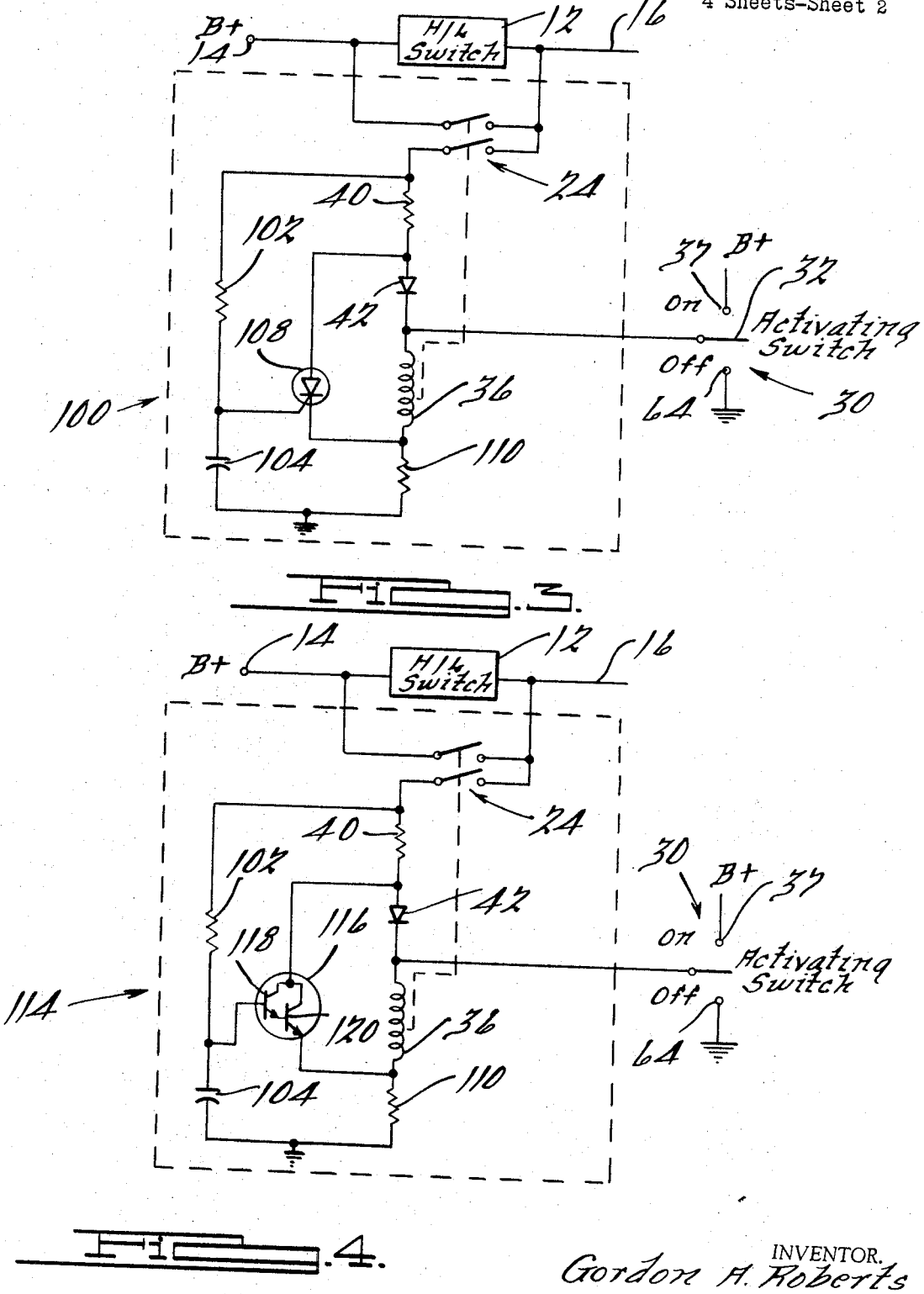

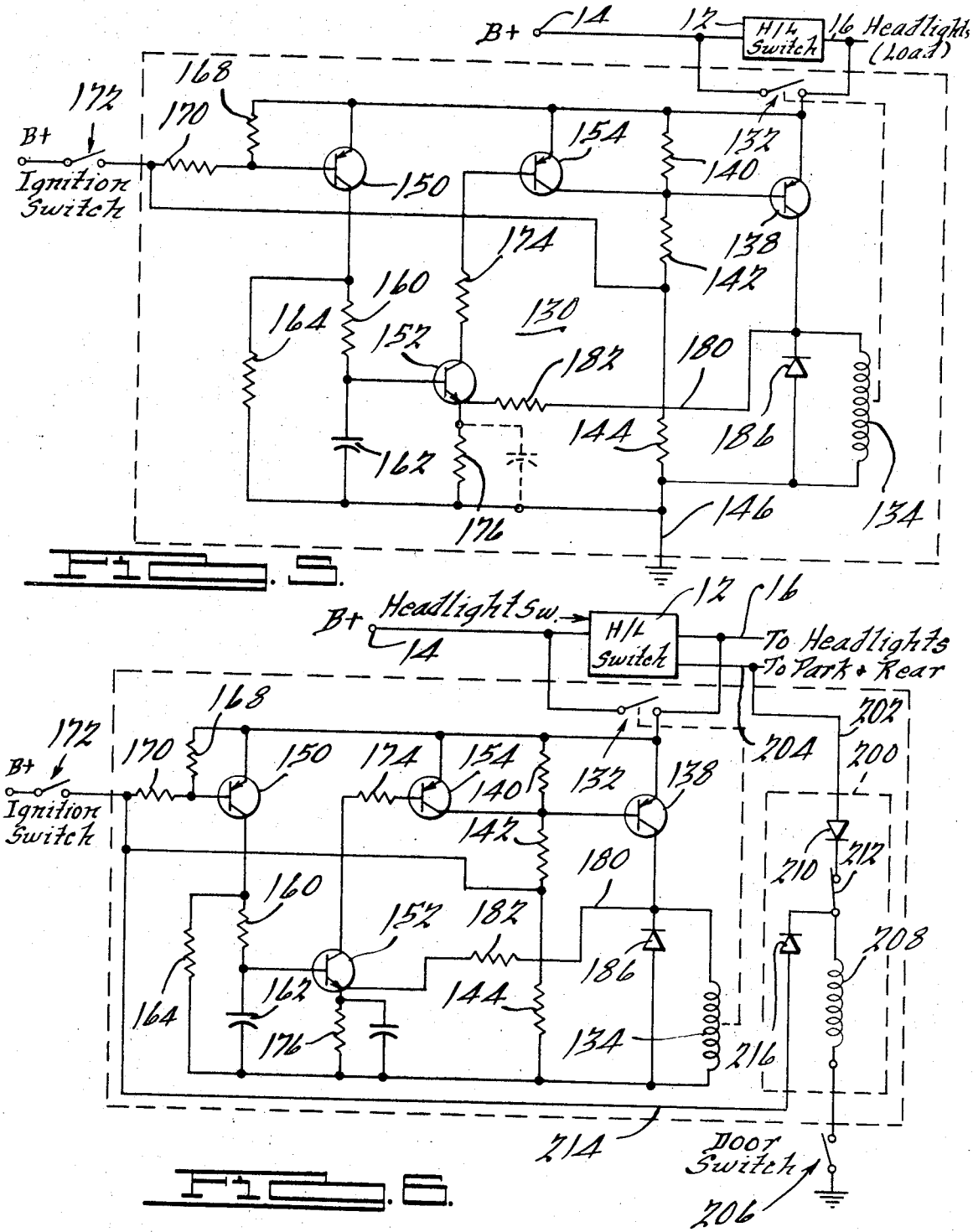

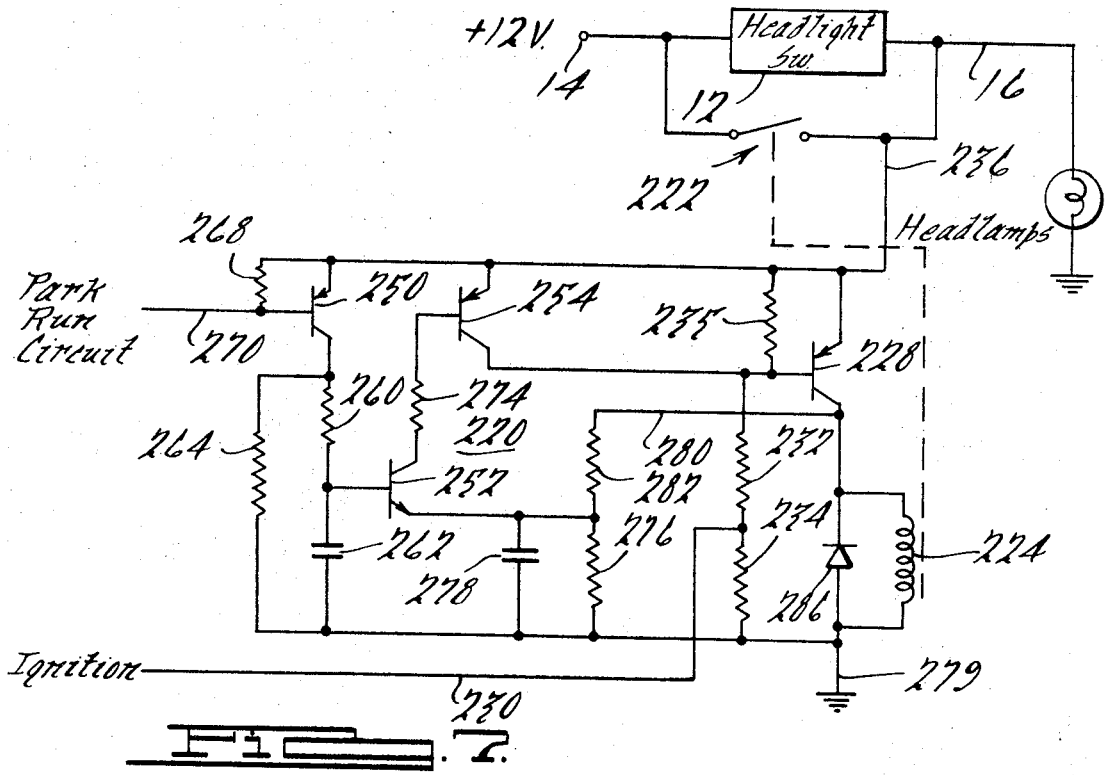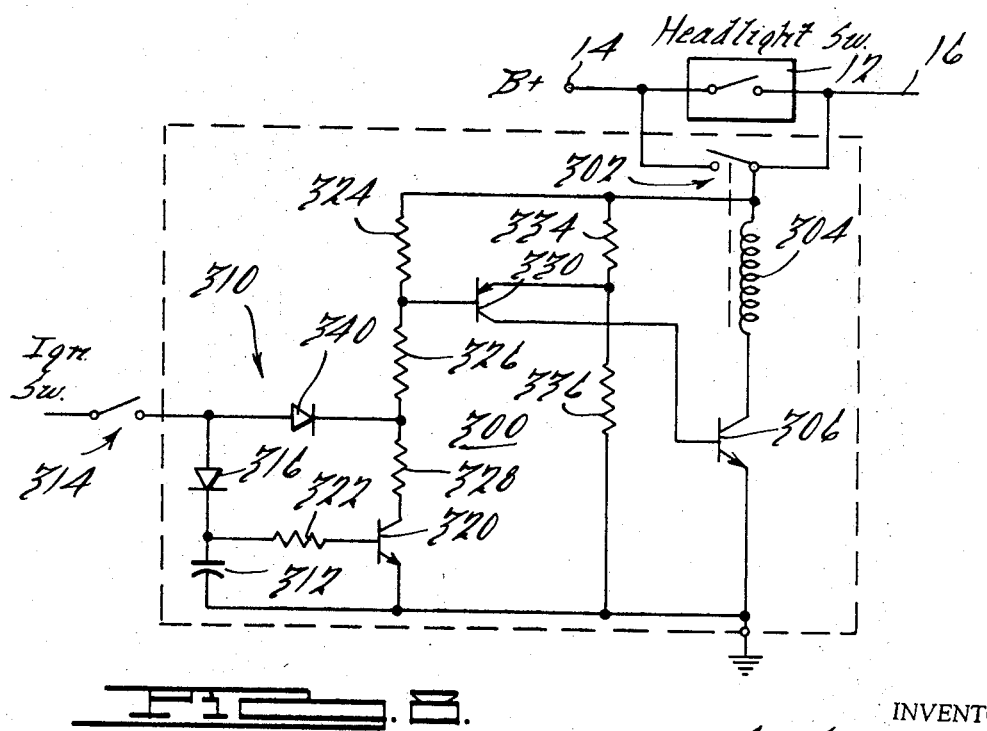

3,530,333
CONTROL SYSTEM
Gordon A. Roberts, Ann Arbor, Mich., assignor, by mesne assignments, to Microdot Inc., New York, N.Y., a corporation of California
Filed Aug. 19, 1968, Ser. No. 753,617
Int. Cl. B60q 1/02
U.S. Cl. 315—83                 19 Claims

ABSTRACT OF THE DISCLOSURE

A control system for use in connection with controlling the operation of vehicle headlights, the system being operative to illuminate the headlamps for a preselected period of time after the headlight switch has been opened. The circuit control system may either be manually or automatically operated to energize a switch assembly illustrated in the form of a relay, the relay having a set of contacts associated therewith to interconnect the headlights with a source of electrical energy until such time as the relay is deenergized. A timing circuit is provided which, when timed out, will cause the relay to deenergize and disconnect the headlights from the source of electrical energy. The system further includes a door switch assembly which senses the condition of the headlight switch or running light switch being closed when the operator opens the door of the vehicle. An audio or visual signal is provided to indicate this condition.

---

The purpose of the foregoing abstract is to enable the Patent Office and the public generally, and especially the scientists, engineers or practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BACKGROUND AND SUMMARY OF THE INVENTION

This invention relates generally to a time delay control system for controlling the energization of a load and more specifically to a delay system for controlling the energization of a headlamp load on a vehicle for a preselected time period after the headlamp control switch has been opened.

The system of the present invention provides either a manual or automatic control system for controlling the energization of the headlights of a vehicle for a preselected delay period, the system being devised to provide a relatively low or practically negligible current draw during the period the system is not being utilized. The circuit of the present invention provides a reliable and inexpensive headlight delay control system which may easily be operated through a manual on-off switch or automatically by sequentially turning off the ignition switch and opening the headlight circuit through the headlamp and running lamp control switch.

Accordingly, it is one object of the present invention to provide an improved control circuit for controlling the deenergization of a load circuit after a preselected period of time.

It is another object of the present invention to provide an improved delay control system for use in controlling the energization of vehicle headlights.

It is still another object of the present invention to provide an improved delay control system which has a zero current drain during the period that the system is not in use.

It is still a further object of the present invention to provide an improved modified delay system which provides for a relatively low or negligible current drain during the period that the system is not in use.

It is still another object of the present invention to provide an improved manual delay control circuit.

It is still another object of the present invention to provide an improved automatic delay control system.

It is a further object of the present invention to provide a delay control system for use in connection with controlling the energization of vehicle headlamps, which control system is inexpensive to manufacture and reliable in use.

Further objects, features and advantages of this invention will become apparent from a consideration of the following description, the appended claims and the accompanying drawings in which:

FIG. 1 is a schematic diagram of a manual delay control system illustrating certain features of the present invention;

FIG. 2 is another schematic diagram of the delay system of FIG. 1 and further incorporating a door switch warning system;

FIG. 3 is a modified form of the control system of FIG. 1;

FIG. 4 is another modification of the delay control system of FIG. 1;

FIG. 5 is a schematic diagram of an automatic delay control system illustrating certain other features of the present invention;

FIG. 6 is a schematic diagram of the automatic delay control system of FIG. 5 and further illustrating a door switch warning system;

FIG. 7 is a schematic diagram of a modification of the automatic delay control system of FIG. 5; and FIG. 8 is a further modified automatic delay system.

Referring now to the drawings and particularly to FIG. 1, there is illustrated a time delay control system 10 which is particularly adapted to be utilized in connection with controlling the energization of the headlamps of a vehicle after the headlamp switch has been opened to permit the operator of the vehicle to have headlamp illumination for a preselected period after the switch has been opened. In the preferred circuit, the circuit elements are chosen to provide a ninety second delay before deenergization of the load. However, this delay may be varied or be made variable. After the lapse of the preselected delay period, the control system 10 will automatically turn off the headlamps to render the entire headlamp control circuit inactive.

The main headlamp circuit includes a headlamp switch 12 which is connected in series controlling relation between a source of electrical energy at 14, as for example the vehicle battery, to a headlamp load connected to an output conductor 16. The delay circuit 10 is adapted to control a normally open bypass circuit 20 which includes a bypass conductor 22 and a normally open double pole single throw switch 24.

The control circuit 10 is actuated by means of a manual actuating switch 30 which includes a normally centered armature member 32 connected to the upper end of a relay coil 6, the lower end of the coil 6 being connected to ground at 4. The armature 32 may be operated to place the armature 32 in contact with a positively energized terminal 37, thus providing pull-in current for relay coil 36. The relay coil is magnetically coupled to the switch 24 to close the switch when the relay 36 is energized. The closing of switch 24 permits energy to flow from the source of battery 14 through conductor 22, switch 24 to the headlamp load connected to conductor 16. Also, the switch 24 permits the flow of energy from conductor 22 through switch 24, a resistor 40 and a diode 42 to the coil 36 to maintain the coil 36 in the energized condition. The resistor 40 limits the current flowing in at least a portion of the control circuit 10 and the diode 42 precludes the flow of current from the source at terminal 37 to the collector-emitter circuit of transistor 50. It is to be understood that the diode 42 may be replaced by a resistor of appropriate value.

The energization of the relay 36 is controlled by means of a main switching transistor 50 which, in turn, is controlled by a driver transistor 52. The transistors 50 and 52 are normally non-conductive and will conduct at such time as a timing circuit, including capacitor 54 and resistor 56, reaches a preselected voltage level. With the closure of switch 24, current begins to flow from the source at terminal 14 through the conductor 22 and switch 24 to the timing capacitor-resistor 54, 56 to charge the capacitor 54. The charging time of capacitor 54 is, of course related to the parameters of capacitor 54 and resistor 56.

Current also flows in a resistor divider network, including resistors 58 and 60, the emitter electrode of transistor 52 being connected at a point between resistors 58 and 60. When the voltage difference between the voltage fed to the emitter and the base electrode of transistor 52 rises to a level to cause transistor 52 to conduct, a signal will be fed to transistor 50 to provide base-emitter current for the transistor 50.

The transistor 50 is connected in shunt relation with the diode 42 and coil 36 to lower the voltage across this latter combination to a point below the drop-out voltage of the coil 36, thus opening the switch 24 and deenergizing the coil 36. The above operation assumes that the armature 32 has been released to its normal position. The opening of switch 24 also eliminates the emitted-collector current through transistors 50 and 52 to switch these latter transistors to the nonconducive state.

Upon the opening of switch 24, the capacitor 54 discharges through a circuit including the emitter-base circuit of transistor 52 and resistor 58, and secondarily, circuits including resistors 58, 60 and 56 and resistor 40, diode 42, coil 36 and resistor 56 in parallel therewith. The current flow through coil 36 due to the discharge of capacitor 54 is insufficient to pull in coil 36. Once the timing sequence has been started, and if it is desired to terminate the timing sequence before the circuit has timed out, the operator may move the armature 32 into contact with a grounded terminal 64. This lowers the voltage across coil 36 to zero thereby dropping out the relay, including contacts 24. Of course, if the armature 32 is moved into contact with the terminal 37 when the headlight switch 12 is closed, the circuit will merely time out without effecting the operation of the headlights.

Referring now to FIG. 2, there is illustrated a control circuit 64 which is substantially identical to the circuit illustrated in FIG. 1 and includes the delay control circuit 10. However, there is additionally provided a buzzer warning circuit 66 which is utilized to warn the operator of the vehicle of a combination of conditions. Particularly, the system warns that the ignition switch is off, the parking and running lights and/or headlights are on and the door to the vehicle is open. This assumes that the headlight delay circuit is not activated. When the delay circuit is activated, provision has been made to inhibit the buzzer circuit by the use of diodes as described below.

The circuit 66 includes a buzzer assembly having a normally closed buzzer switch 68 which is opened at such time as a coil 70 is energized. The switch 68 and coil 70 are connected in series circuit with a diode 72, for a purpose hereinafter to be explained, these elements being connected to a park and running light load conductor 74 or any other circuit which supplies the information that the headlamp and/or park and running lamp loads have been left energized. It is to be understood that the combination of elements 68, 70, 72 may also be connected to the headlight load conductor 16 if the circuit is modified by placing a diode 73 (shown in dashed lines) in circuit directly adjacent the output from the headlamp switch and before the connection of switch 24 to conductor 16, and connecting the lead from diode 72' between the headlamp switch 12 and the additional diode 73 discussed above (also shown in dashed lines). Direct headlamp load connection may also be accomplished by connecting the combination of elements 68, 70, 72 to the headlight conductor 16 (shown in dot-dashed lines) if a diode 75 is added at the secondary armature of the relay and connected to the armature of the buzzer (the same point as diode 90). Thus, the buzzer circuit is disabled and the diode 73 may be eliminated.

The park and running might load conductor 74 supplies positive direct current energy to the coil 70 through a normally open door switch 80, the door switch 80 being in the open position when the vehicle door is closed. The door switch 80 is grounded at 82 to provide a return path for the battery energy. Thus, when the parking and running lights are energized, current will flow through the diode 72, switch 68, coil 70, door switch 80 to ground at 82. The energization of the coil 70 opens the switch 68, thus breaking the circuit to the coil 70. Upon discontinuing the coil energy, the switch 68 will close and a buzzing sound will be produced through the incipient opening and closing of switch 68.

In the situation when the door is opened and the ignition switch is on, it is desired to disable the buzzer circuit. An ignition switch 88 is connected to the upper end of coil 70 through a diode 90. Accordingly, if the door is open, closing switch 80, and the ignition switch is off closing switch 88, continuous direct current energy is fed through the diode 90, the coil 70, the door switch 80 to ground 82. In this way coil 70 is continuously energized to hold switch 68 in the open condition. The diode 72 blocks direct energy from flowing to the parking and running lights through the ignition switch 88.

Referring to FIG. 3, there is illustrated a modified form of the delay circuit of FIG. 1 including substantially the same elements. Specifically, a headlight lamp load is connected to the output conductor 16 and is fed with direct current energy from input terminal 14, the energy being controlled by a headlight switch 12. A modified delay circuit 100 is interconnected electrically with the battery terminal 14 by means of the normally open control switch 24. The delay circuit includes the resistor 40, the diode 42 and the relay coil 36, the coil 36 being magnetically interconnected to control the normally open switch 24. When the switch 24 is closed, energy is fed to a timing circuit including a resistor 102 and capacitor 104 to start the timing cycle, in this case to charge the capacitor during the timing cycle. The switch 24 is initially closed by energizing the coil 36 through the activating switch 30, as was described in conjunction with FIG. 1.

With the energization of coil 36, and thus the closure of switch 24, the headlamp load connected to conductor 16 is provided with electrical energy from the battery source 14 and also starts the timing cycle by means of the timing circuit including resistor 102 and capacitor 104. A silicon controlled rectifier 108 is connected in shunt relation with the diode 42 and coil 36 in a manner similar to the shunt connection of transistor 50 (FIG. 1). Thus, the controlled rectifier 108 is normally nonconductive and will remain nonconductive until such time as the charge on capacitor 104 is built up sufficiently to forward bias the gate-cathode electrode on the controlled rectifier 108. The potential to which capacitor 104 must rise is increased by means of a resistor 110 connected to the cathode electrode of the controlled rectifier. Thus, the current flowing through the coil 36 will provide a positive potential at the upper end of resistor 110 to bias the controlled rectifier 108 to some positive potential.

It is to be understood that the buzzer circuit 66 illustrated in FIG. 2 may also be incorporated into the circuit illustrated in FIG. 3. It is to be further understood that the modifications discussed in connection with FIG. 2 may also be incorporated into FIG. 3.

FIG. 4 illustrates another modification 114 of the manually operated delay circuit of FIG. 1, as modified by FIG. 3, and further includes a high current gain Darlington circuit configuration 116 which includes a first NPN transistor 118 connected in current controlling relation with a second NPN transistor 120. The transistor circuit configuration is connected in shunt relation with the diode 42-coil 36 combination to drop out the relay coil 36 at such time as the transistor circuit 116 conducts. The time of conduction of circuit 116 is related to the degree of charge on capacitor 104 and also the current flowing through the resistor 110, the resistor 110 raising the emitter voltage of the second transistor 120.

Accordingly, when the switch 30 is actuated to contact the terminal 37, the coil 36 is energized to close the switch 24. The closed switch 24 initiates the timing of resistor-capacitor circuit 102, 104 and also causes current to flow through coil 36 to hold switch 24 in the closed position. As stated above, the current flowing in coil 36 also flows in resistor 110 to raise the emitter voltage of transistor 120. At such time as the base voltage of transistor 118 is sufficiently above the emitter voltage of transistor 120, the Darlington configuration 116 conducts to shunt current around the diode 42-coil 36 combination. This shunted current causes coil 36 to drop out, thus opening the switch 24 and discontinuing any current flow in the coil 36 or the circuit 116.

FIG. 5 illustrates an automatic delay control circuit which may be utilized in automatically delaying the de-energization of vehicle headlamps without the necessity of operating an activation switch. The particular circuit illustrated is primarily operated by the operator first turning off the ignition switch to the vehicle and subsequently turning off the headlamp switch.

Specifically, an automatic delay control system 130 is interconnected with the headlamp switch 12 described in conjunction with FIGS. 1 to 4. The particular control circuit 130 is adapted to control a single pole switch 132 through the energization and deenergization of a coil 134. The energized or deenergized condition of the coil 134 is controlled by a normally conducting PNP transistor 138 connected in series therewith. The transistor 138 is held in the conductive state when the headlight load is energized by means of the conductor 16 through a voltage divider circuit including a resistor 140 connected between the emitter and base electrodes of transistor 138 and a pair of resistors 142, 144 connected from the base electrode and ground at 146. Accordingly, when the headlight switch 12 is closed and the ignition switch 172 is open, current will flow from the conductor 16 through the normaly conductive transistor 138 to the coil 134. The energization of the coil 134 will in turn close the switch 132, the switch 132 forming a holding circuit for the coil 134. The headlamp switch 12 is then opened and the headlamp load is maintained through the switch 132.

The transistor 138 will remain conductive until such time as the delay circuit 130 times out, the timing of the delay circuit being controlled by a normally conductive transistor 150, the conductive condition of the transistor 138 being controlled by a pair of transistors 152, 154, in a manner to be hereinafter explained.

The timing circuit includes a resistor 160 and capacitor 162 connected in series therewith, and a second resistor 164 connected in parallel with the series combination. The current flow through the timing circuit is controlled by means of the normally conductive transistor 150, the conduction of the transistor 150 being controlled by a circuit including resistors 144, 168 and 170 and the ignition switch 172.

Assuming that either the headlamp switch is left on or is turned on and then off, and further the ignition switch has been turned off prior to the turning off of the headlamp switch, current will flow from the source of electrical energy at terminal 14 through the resistors 168, 170 and 144 to ground to maintain the normally conductive transistor 150 to the conductive state. Current flow through the transistor 150 will charge capacitor 162 in accordance with the particular circuit parameters of the charging circuit, specifically the values of resistor 160 and capacitor 162.

When the capacitor 162 is sufficiently charged, transistor 152 will conduct. The energy for transistor 152 is derived through the emitter-base circuit of transistor 154, the conduction of transistor 152 causing transistor 154 to conduct, a resistor 174 connected between the base of transistor 154 and the collector of transistor 152, and a resistor 176 connected between the emitter circuit of transistor 152 and ground. It is to be noted that current also flows through transistor 138, a conductor 180, a resistor 182, and resistor 176 to ground, thereby raising the potential of the emitter electrode of transistor 152. Thus, the capacitor 162 must charge to a sufficient voltage to provide a forward bias for the base-emitter electrodes of transistor 152.

The conduction of transistor 154 lowers the potential between the emitter and base electrodes of transistor 138 to such an extent as to cut off the conduction of transistor 138 and thus halt the flow of current to the coil 134. With the coil 134 deenergized, the switch 132 will be opened to deenergize the headlamp load, assuming the headlamp switch 12 has been opened. A diode 186 is connected in parallel circuit with the coil 134 to absorb any "inductive kick" as a result of the deenergization of the coil 134. Also, a capacitor may be connected in shunt with resistor 176 to obviate any transients generated, as for example, when the buzzer circuit is utilized.

The above description has been based on the assumption that the headlamp load is energized through the switch 12 for a period of time after the ignition switch 172 has been opened. It is to be noted that the ignition switch 172 is connected to the battery voltage to clamp the base electrode of transistor 150 to a positive potential which is substantially equal to the potential impressed on the emitter electrode. Thus, as long as the ignition switch 172 is closed, the transistor 150 will remain in the nonconductive state to preclude the starting of the timing cycle.

In the event that the headlamp load is being energized directly from the headlamp switch 12, and the ignition switch is subsequently opened, the timing circuit 130 will go through one timing cycle and then remain inactive thereafter. This is due to the rise in potential of the emitter electrode of transistor 152 because of the current flow through resistor 176. Also, it is to be noted that the time delay is initiated by the opening of the ignition switch and not the opening of the headlamp switch.

FIG. 6 illustrates a modified form of FIG. 5 wherein a buzzer circuit 200 has been added to the circuit of FIG. 5 to indicate when the door of the vehicle has been opened and the parking lights have been left on. The circuit 200 is rendered responsive to the energization of the parking lights by means of a conductor 202 connected to the parking light load circuit conductor 204. A door switch 206 is connected to the buzzer coil 208 so that current is permitted to flow from the parking light load conductor 204 through conductor 202, a diode 210, a buzzer switch 212, the coil 208, the door switch 206 to ground.

Accordingly, the buzzer, including switch 212 and coil 208, will operate in a manner similar to that described in conjunction with FIG. 2, that is, the coil 208 will operate, when energized, to open the switch 212 and thus comprise a self-interrupting buzzer circuit.

It has been found to be desirable to disable the buzzer circuit when the ignition switch is closed. Accordingly, the coil 208 is connected to a source of positive DC potential, through the ignition switch 172, by means of a conductor 214 and a diode 216. When the ignition switch has been closed and the door switch is closed due to the opening of the door, the coil 208 will be constantly energized through the diode 216, thus disabling the buzzer circuit.

FIG. 7 illustrates a modification of the automatic delay control circuit of FIG. 5 which also may be utilized in automatically delaying the deenergization of vehicle headlamps without the necessity of operating an activation switch. The particular circuit illustrated is primarily operated by the operator turning off the headlamp switch to start the timing cycle. The closed condition of the ignition switch holds the output portion of the delay circuit in its inactive state.

Specifically, an automatic delay control system 220 is interconnected with the headlamp switch 12 described in conjuction with FIGS. 1 to 4. The particular control circuit 220 is adapted to control a single pole switch 222 through the energization and deenergization of a coil 224. The energized or deenergized condition of the coil 224 is controlled by a normally nonconducting PNP transistor 228 connected in series therewith. The transistor 228 is held in the nonconductive state when the ignition circuit is energized by means of the conductor 230 through a voltage divider circuit including the resistors 232, 234 connected between the base electrode of transistor 228, thus holding the base electrode of the transistor 228 at battery potential, this potential also being applied to the emitter electrode through the headlamp switch 12 and conductor 236. When the ignition switch is opened, current flows from conductor 16, through the voltage divider, including a resistor 235 and resistors 232, 234, to bias the transistor 228 into conduction. Accordingly, when the headlight switch 12 is closed and the ignition switch is open, current will flow from the conductor 16 through the conducting transistor 228 to the coil 224. The energization of the coil 224 will in turn close the switch 222, the switch 222 forming a holding circuit for the coil 224 after the headlamp switch 12 is opened. When the headlamp switch 12 is opened, the headlamp load is maintained through the switch 222.

The transistor 228 will remain conductive until such time as the delay circuit 220 times out, the initiation of the timing of the delay circuit being controlled by a normally nonconductive transistor 250.

The timing circuit includes a resistor 260 and a capacitor 262 connected in series therewith, a second resistor 264 being connected in parallel with the series combination. The current flow through the timing circuit is controlled through the conduction of transistor 250, the conduction of the transistor 250 being controlled by a circuit including a resistor 268 and a conductor 270 connected to the park-run circuit, this latter circuit being energized in response to the closure of the headlamp switch, when the conductor 270 is impressed with positive battery voltage, the base and emitter electrodes are at substantially the same potential, thus precluding flow of current through transistor 250 and the timing circuit.

Assuming that the headlamp switch is turned off, and further the ignition switch has been turned off prior to the turning off of the headlamp switch, current will flow from the source of electrical energy at terminal 14 through the resistor 268 to ground through the park-run circuit to switch the normally nonconductive transistor 250 to the conductive state. Current flow through the transistor 250 will charge capacitor 262 in accordance with the particular circuit parameters of the charging circuit, specifically, the values of resistor 260 and capacitor 262.

When the capacitor 262 is sufficiently charged, the base electrode of a transistor 252 will be raised to a sufficient level to cause transistor 252 to conduct. The energy for transistor 252 is derived through the emitter-base circuit of a transistor 254, the conduction of transistor 252 permitting transistor 254 to conduct, a resistor 274 being connected between the base of transistor 254 and the collector of transistor 252, and a resistor 276 connected between the emitter circuit of transistor 252 and ground at 279. It is to be noted that current also flows through transistor 228, a conductor 280, a resistor 282, and resistor 276 to ground, thereby raising the potential of the emitter electrode of transistor 252. Thus, the capacitor 262 must charge to a sufficient voltage to provide a forward bias for the base-emitter circuit of transistor 252.

The conduction of transistor 254 lowers the potential between the emitter and base electrodes of transistor 228 to such an extent as to cut off the conduction of transistor 228 and thus halt the flow of current to the coil 224. With the coil 224 deenergzied, the switch 222 will be opened to deenergize the headlamp load, assuming the headlamp switch 12 has been opened. A diode 286 is connected in parallel circuit with the coil 224 to absorb any inductive transients as a result of the deenergization of the coil 224. Also, the capacitor 278 is connected in shunt with resistor 276 to obviate any transients generated, as for example, when the buzzer circuit is utilized.

The above description has been based on the assumption that the headlamp load is energized through the switch 12 for a period of time after the ignition switch connected to conductor 230 has been opened. It is to be noted that the ignition switch is connected to the battery voltage to clamp the base electrode of transistor 228 to a positive potential which is substantially equal to the potential impressed on the emitter electrode, as is the case with transistor 250 clamped by the park-run circuit. Thus, as long as the ignition switch is closed, the transistor 228 will remain in the nonconductive state to preclude the energization of the coil 224.

Referring now to FIG. 8 there is illustrated a further modified circuit 300 of the automatic circuits described in conjunction with FIGS. 5 to 7. Specifically, the energy from input terminal 14 to the headlamp load connected to conductor 16 is controlled by means of the headlamp switch 12 and the automatic timing circuit 300 is connected in controlling relation with a bypass switch assembly 302. The switch 302 is closed in response to the energizing of coil 304, the coil 304 being controlled by means of normally conductive transistor 306 connected in series therewith. The transistor 306 is conductive during the period that energy is being applied to the load, the ignition switch is open and the timing circuit 310 has not timed out.

Specifically, the timing circuit includes a capacitor 312 which is adapted to be charged through the ignition switch 314 and a diode 316. The voltage across capacitor 312 is impressed across the base-emitter circuit of an NPN transistor 320 through a resistor 322. The conduction of transistor 320 is maintained as long as the charge on capacitor 312 is sufficient to forward bias the base-emitter circuit of transistor 320.

The transistor 320 is connected in series with a voltage divider circuit including resistors 324, 326, 328 wherein current flowing through the transistor 320 also flows through the resistors 324, 326, 328. Current flowing through resistor 324 forward biases the emitter-base circuit of a driver transistor 330, the emitter collector circuit of transistor 330 being connected in series controlling relation with the base-emitter circuit of transistor 306. The emitter circuit of transistor 330 is connected to a voltage divider which includes resistors 334, 336.

In operation, and assuming that the headlamp switch and the ignition switch are closed, capacitor 312 is charged up through the ignition switch 314 to cause transistor 320 to conduct. The conduction of transistor 320 tends to switch transistor 330 to the conductive state which would, in turn, render transistor 306 conductive. The conduction of transistor 306 energizes coil 304 to close the switch 302 in parallel with the headlight switch 12. However, it is to be noted that a diode 340 is connected between the ignition switch 314 and the junction between resistors 326, 328. This diode is utilized to clamp the base of transistor 330 to battery voltage. Thus, the conduction of transistor 330 and transistor 306 is inhibited during the time that the ignition switch is closed.

When the ignition switch and, thereafter, the headlamp switch are opened, the headlamps are energized through the switch 302 until such time as the timing circuit 310 times out. This timing period is initiated by the opening of the ignition switch which permits capacitor 312 to discharge through resistor 322 and the base-emitter circuit of transistor 320. When the voltage level of capacitor 312 drops below that required to maintain transistor 320 conductive, the transistors 320, 330 and 306 will be switched off. The nonconduction of transistor 306 deenergizes coil 304, opening switch 302, thus deenergizing the headlamp load. The diode 340 is also provided to preclude energy flowing from the headlamp load circuit to any circuit connected to the right side of ignition switch 314.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. An apparatus for switching the energization of a lamp circuit of a vehicle from a source of electrical energy between a first state and a second state, the lamp circuit including a manual switch connected in circuit with the source of electrical energy and the lamp for manually controlling the lamp circuit, the improvement comprising switch means connected in circuit with the manual switch for overriding the effect of the manual switch, and timing circuit means connected to the source of electrical energy and actuable to time a preselected period, including control means connected to said switch means for controlling the operation of the switch means in response to the timing of said period, said switch means being adapted to be connected between the source of electrical energy and the lamp circuit to place the lamp circuit in the first state at the start of said period and place the lamp circuit in the second state in response to the timing of the end of said period, said timing circuit means including a controllable semiconductor device connected in current controlling relation with said control means, and an energy charge storage device adapted to be connected to the source to be charged from said source of electrical energy after operation of said switch means, the charge condition of said energy storage device controlling the conduction of said semiconductor device and, in turn, said control means and said switch means.

2. The invention of claim 1 further including a timer control switch connected to said control means for actuating said switch means, said timing circuit being actuable in response to the actuation of said switch means.

3. The invention of claim 1 wherein said switch means includes an automatic switch connected in parallel circuit with the manual switch.

4. The invention of claim 3 wherein said switch means is a switch having a set of contacts and a movable armature.

5. The invention of claim 1 wherein said control means includes a three terminal semiconductor device and a relay coil controlled by the semiconductor device, said semiconductor device having an electrode connected to said timing circuit to control the conduction of said semiconductor device in response to the timing of said period.

6. The invention of claim 1 wherein said apparatus further includes a warning circuit to indicate the condition that the lamp circuit is energized through the manual switch and another condition of the vehicle, said warning circuit including indicator means connected to the lamp circuit and energized thereby, and condition switch means controlled by the said other conditions for enabling the indicator means in response to the occurrence of the other condition.

7. The invention of claim 13 further including an ignition switch, said invention further including automatic timing initiation circuit means connected to said timing circuit for starting the timing of said period, said timing initiation circuit being operable when the manual switch is actuated after the opening of the ignition switch.

8. The invention of claim 7 wherein said timing initiation circuit includes gate means connected to the timing circuit for controlling the flow of electrical energy to the timing circuit, said gate means being disabled in response to the closing of the ignition circuit.

9. The invention of claim 8 wherein said control means includes a three terminal semiconductor device having one terminal connected to said timing circuit and another terminal connected to respond to the energization of said switch means so that only one period will be timed by said timing circuit when said manual switch remains closed after the opening of the ignition switch.

10. The invention of claim 7 further including means for initiating the timing of said period upon the opening of the ignition switch.

11. The invention of claim 1 further including means for initiating the timing of said period upon the actuating of said lamp circuit manual switch.

12. The invention of claim 6 wherein said another condition is the open door of the vehicle.

13. An automatic apparatus for switching the energization of a lamp circuit of a vehicle from a source of electrical energy between a first state and a second state, the lamp circuit including a manual switch connected in circuit with the source of electrical energy and the lamp for manually controlling the lamp circuit, the improvement comprising switch means connected in circuit with the manual switch for overriding the effect of the manual switch, and timing circuit means connected to the source of electrical energy and actuable to time a preselected period, including relay coil control means connected to said switch means for controlling the operation of the switch means in response to the timing of said period, said switch means being adapted to be connected between the source of energy and the lamp circuit to place the lamp circuit in the first state at the start of said period and place the lamp circuit in the second state in response to the timing of the end of said period, said timing circuit including a controllable semiconductor device connected in series with said relay coil, said semiconductor device being connected only to one terminal of the energy source and said relay coil being connected only to the opposite terminal of the energy source when said semiconductor device is conducting.

14. An apparatus for switching the energization of a lamp circuit of a vehicle from a source of electrical energy between a first state and a second state, the lamp circuit including a manual switch connected in circuit with the source of electrical energy and the lamp for manually controlling the lamp circuit, the vehicle including an ignition switch, the improvement comprising switch means connected in circuit with the manual switch for overriding the effect of the manual switch, an actuating switch, and timing circuit means connected to the source of electrical energy and actuable to time a preselected period, including control means connected to said switch means for controlling the operation of the switch means in response to the timing of said period, said actuating switch being connected to one pole of the electrical source and said control means being connected to the other pole of the source, the actuation of said actuation switch energizing said control means and said switch means, said switch means being adapted to be connected between the source of energy and the lamp circuit to place the lamp circuit in the first state at the start of said period and place the lamp circuit in the second state in response to the timing of the end of said period.

15. The invention of claim 14 further including a timer control switch connected to said control means for actuating said switch means, said timing circuit being actuable in response to the actuation of said switch means.

16. The invention of claim 15 wherein said switch means includes an automatic switch connected in parallel circuit with the manual switch.

17. The invention of claim 16 wherein said switch means is a switch having a set of contacts and a movable armature.

18. The invention of claim 14 wherein said control means includes a three terminal semiconductor device and a relay coil controlled by the semiconductor device, said semiconductor device having an electrode connected to said timing circuit to control the conduction of said semiconductor device in response to the timing of said period.

19. The invention of claim 14 wherein said apparatus further includes a warning circuit to indicate the condition that the lamp circuit is energized through the manual switch and another condition of the vehicle, said warning circuit including indicator means connected to the lamp circuit and energized thereby, and condition switch means controlled by the said other condition for enabling the indicator means in response to the occurrence of the other condition.

References Cited

UNITED STATES PATENTS

| | | | |
|---|---|---|---|
| 2,802,142 | 8/1957 | Johnson | 315—80 |
| 3,211,951 | 10/1965 | Skinner et al. | 315—76 |
| 3,225,250 | 12/1965 | Hershberger | 315—82 |
| 3,374,394 | 3/1968 | Miller | 315—82 |
| 3,389,296 | 6/1968 | Carruth | 315—77 |

JOHN HUCKERT, Primary Examiner

R. F. POLISSACK, Assistant Examiner

U.S. Cl. X.R.

315—77, 84, 360; 317—141, 148.5; 340—377

Notice of Adverse Decisions in Interferences

In Interference No. 98,101 involving Patent No. 3,530,333, G. A. Roberts, CONTROL SYSTEM, final judgment adverse to the patentee was rendered Aug. 9, 1973, as to claims 14, 18 and 19.

[*Official Gazette November 27, 1973.*]